Figure 5:
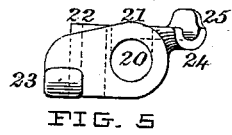

(No Model.) 2 Sheets—Sheet 1.

E. G. WATROUS.
BUNDLE CARRIER FOR HARVESTING MACHINES.

No. 507,604. Patented Oct. 31, 1893.

WITNESSES:
Charles H. Houghton
M. C. Huling

INVENTOR:
EARL G. WATROUS,
BY Franklin Scott, ATTORNEY.

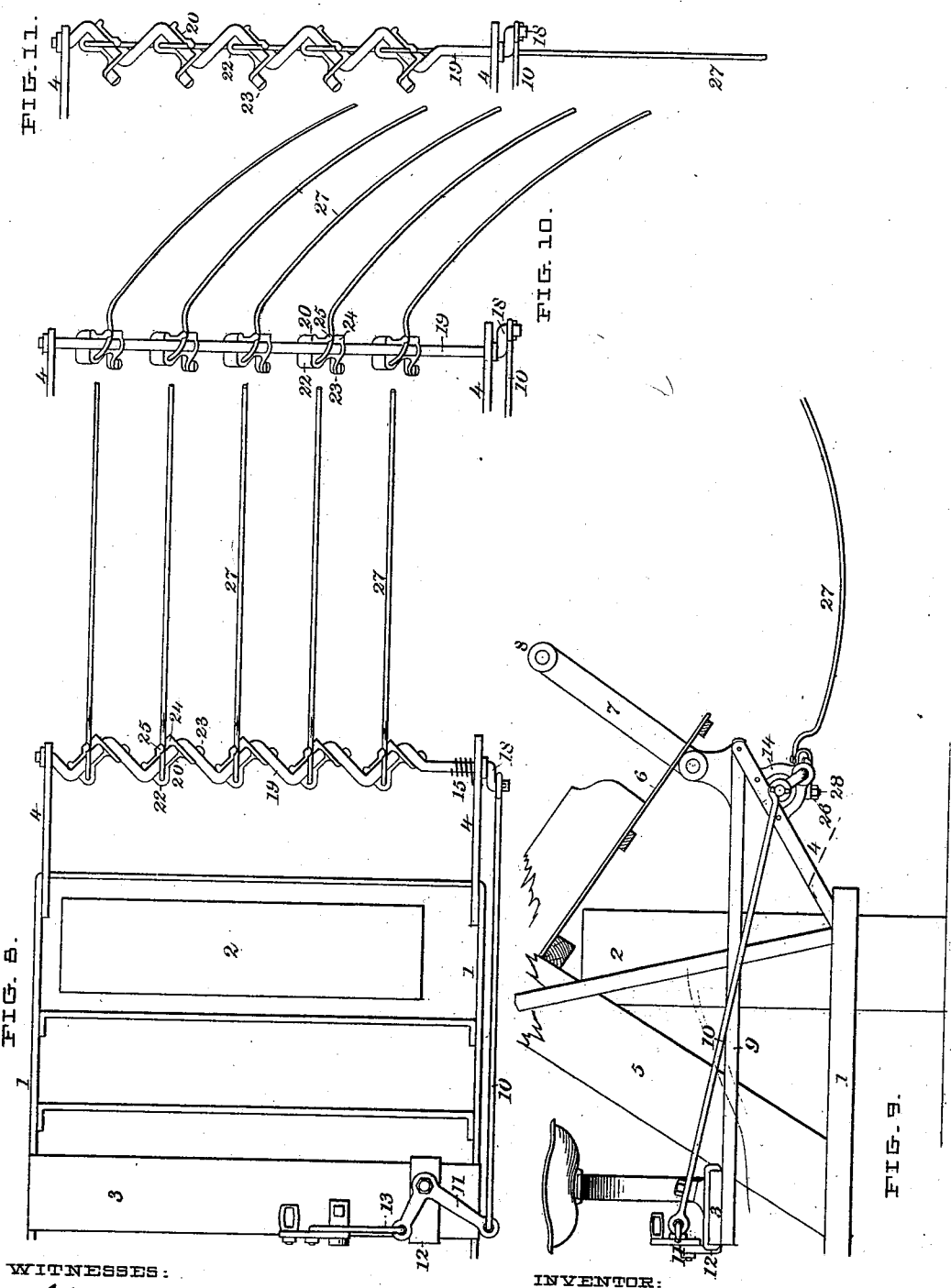

UNITED STATES PATENT OFFICE.

EARL G. WATROUS, OF HOOSICK FALLS, NEW YORK.

BUNDLE-CARRIER FOR HARVESTING-MACHINES.

SPECIFICATION forming part of Letters Patent No. 507,604, dated October 31, 1893.

Application filed March 20, 1893. Serial No. 466,816. (No model.)

*To all whom it may concern:*

Be it known that I, EARL G. WATROUS, of the village of Hoosick Falls, in the county of Rensselaer and State of New York, have invented certain new and useful Improvements in Bundle-Carriers for Harvesting-Machines; and I hereby declare that the subjoined description, in connection with the accompanying drawings, constitute a specification of said invention and of the method of constructing and operating the same.

The object of the invention is to provide that class of harvesting machines which are equipped with binders, with suitable means for receiving and carrying a number of bundles or sheaves and for discharging a load so accumulated by dropping them on the ground at the will of the operator.

My invention will first be fully described and the distinctive features of the invention afterward pointed out in the claims.

It is fully disclosed in the drawings wherein I have shown in a series of figures, 1 to 7 inclusive, illustrating detached details of my machine, those parts and their mode of conjoint use which exhibit the means and the principle of operation embodied in the machine to effect the purposes of my invention.

In general, my invention consists of a series of carrying fingers each independently journaled on a rockshaft of peculiar zigzagged construction which is under the control of the operator. The several parts are so designed and constructed that the delivery of the bundles after their accumulation on the fingers is accomplished by two successive but separate functions; the first being the lowering or dropping act, and the second the withdrawal of the carrying fingers from beneath the dropped load. The restoration of the operative parts to their normal dormant position to take on another load is effected by a reversal of the delivery movements.

The "dumping" or "dropping" act is effected by the rotation of the zig-zag rockshaft, the shaft and fingers during this act maintaining the same fixed relation to each other as subsisted during the accumulation of the load; the withdrawal of the fingers from beneath the dropped bundle or load is effected by the joint action or influence of two things; one of which is the engaging contact of the outer points of the carrying fingers with the standing stubble or with the ground whereby resistance is offered to the further advance of the points of the fingers in the direction of movement of the machine, and the other is the advancing movement of the machine itself, whereby the resistance so offered operates in connection with the advancing movement of the machine to cause the fingers to be dragged in under or toward the under side of the rockshaft. This method of dropping the load secures its delivery on the ground well away from the machine, and no part of the movement of the apparatus has any effect to haul or drag the delivered load back toward or under the machine itself.

Figure 4:
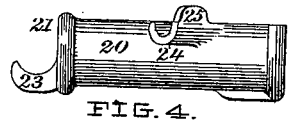
Figure 6:
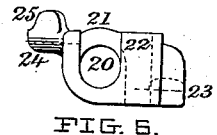
Figure 3:
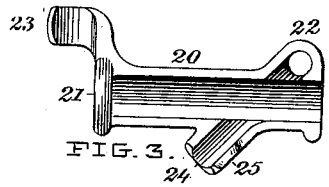
Figure 7:
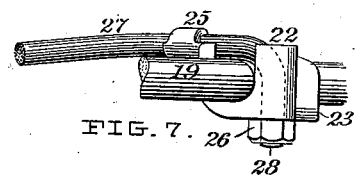
Figure 1:
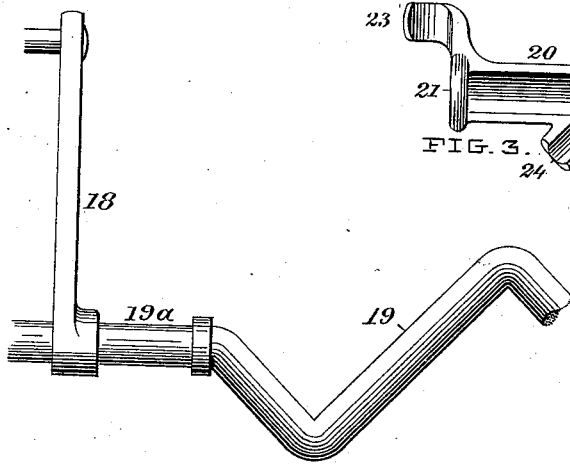
Figure 2:
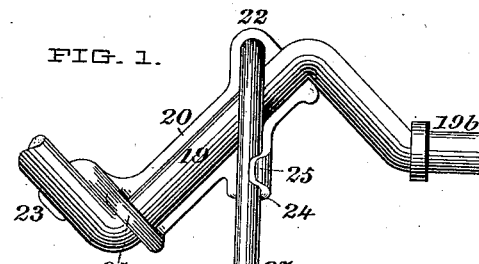
Figure 2:
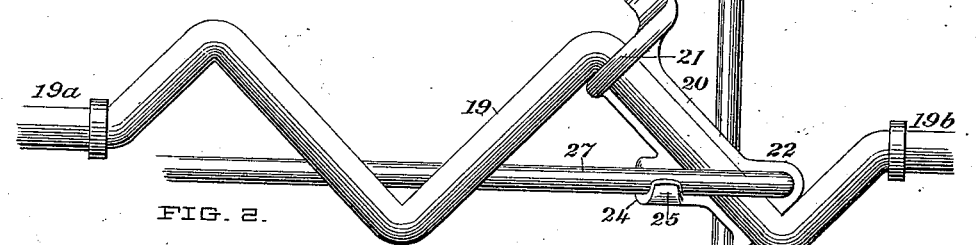

Figure 1 of the drawings shows a section of a rockshaft with a journal at each end and zigzagged throughout its entire length for the purpose of providing journal seats for the carrying fingers, each journal having a uniform angular relation to the axis of the shaft, with one of the carrying fingers journaled thereon. This view is a horizontal plan showing the relations of the parts when the fingers are in position to take on a load from the binder. Fig. 2 shows the relative positions of the same parts after the rockshaft has made a semi-revolution. Fig. 3 is a plan view of one of the finger sockets which is adapted to be carried by and to be rotated on one of the socket journals of the rockshaft. Fig. 4 is a side view of one of the finger sockets. Figs. 5 and 6 are end views of the same. Fig. 7 is a detail of an end view of one of the sockets with sections of the shaft and one of the fingers showing their mode of connection. Fig. 8 is a plan view of a part of a harvester frame with my invention attached. Fig. 9 is a rear elevation of the same. Fig. 10 is a plan view of the bundle carrier with the rockshaft rotated to a point where the zig-zags stand in a vertical plane. Fig. 11 shows the position taken by the fingers at the termination of a semi-rotation of the rockshaft, and exhibits them lying directly under the shaft itself.

In the drawings the frame of the harvester is shown at 1, 3 and 4, the driving wheel being shown at 2. The two arms 4 4 have bearings at their outer ends for the reception of the journals of the rockshaft 19. This rockshaft has a crank at its outer end with which a connecting rod 10 is connected the other end of said rod being attached to the bell crank 11 as shown. This bell crank is pivoted on a seat 12 which rests on the top of the driver's platform 3 and its short arm is connected with the operating rod 13 which is placed under the control of the driver's foot. The driver by throwing this rod 13 back and forth can oscillate the crank 18 of the rockshaft.

The rockshaft 19 is constructed or bent as shown, in zig-zag form and every other of the bends is fitted to take on one of the finger socket bearings seen in Fig. 3. These finger sockets are each fitted with a semi-tubular seat 24 for the reception of the finger and a lip 25 which is provided to be bent down over the top of the finger after it is in position as seen in Fig. 7. On its opposite side is another socket for the reception of the bent shank 28 of the finger. This shank is held in seat by the nut 26 so that when the finger shank is in position with the nut screwed up and the lip 23 bent down the finger socket bearing is permanently attached to the shaft but not so tightly but that it may be easily turned thereon. The opposite end of the socket has a collar 21 which is adapted to slip around the bends in the rockshaft and forms a bearing on the shaft at this end. At the same end of the socket a stop-hook 23 is provided the office of which is to engage the adjacent angle bend of the rockshaft for the purpose of supporting the fingers while gathering and carrying the load. The rotation of the sockets on the shaft is limited in one direction by the stop hook locking on the under side of the shaft as seen in Figs. 1 and 8, and in the opposite direction by the finger encountering the ground or any other obstacle.

In practice when the fingers are held in position as in Fig. 9 to receive and carry a load from the binder, the bundles are delivered onto the fingers from the binder table 6 until a sufficient load has accumulated to dump. When this stage of procedure is reached, the driver by forcing rod 13 backwardly swings the bell crank 11 and forces the crank 18 over thereby permitting the fingers to drop until their outer ends touch the stubble or the ground. During this movement there has been no swinging of the load backwardly or toward the machine at all. Its effect is wholly to cause the load to slide along down the fingers toward their outer ends and away from the machine and off the fingers themselves. In process of rotating the rockshaft, the moment the tips of the fingers find obstruction from the stubble or the ground, the further rotation of the rockshaft by the driver causes it to move out of engagement with the stophooks 23 thus leaving each finger free to turn on its bearing in either direction in obedience to any influence which may be brought to bear on it. This feature of construction is of value and utility in passing over rough or stony ground, as it favors each finger disentangling itself from the bundle or load without involving any of its fellows.

The peculiar movement described by the angular journals 19 as the rockshaft is rotated may well be described as a nutatory motion as it assimilates to the motion commonly known as that of "nutation." If the finger which is journaled on this angular journal has the motion which is imparted to it by the rotation of the rockshaft arrested, further rotation of the rockshaft will cause it to move in a plane coincident with the axis of rotation of the rockshaft until the shaft has made a semi-revolution when its motion will be reversed and it will return to its former position. This combination of devices is one to convert rotary into reciprocatory motion.

I therefore claim as my invention—

1. The combination of the rockshaft provided with the described journal set at an angle with the axis of rotation of the rockshaft with the journal bearing adapted to turn upon said journal and having a carrying finger attached thereto, substantially as specified.

2. The combination of the rockshaft provided with one or more journals set at an angle with its axis of rotation, with the journal bearings adapted to turn upon said journals and having carrying fingers attached thereto and provided with devices substantially as shown for limiting the movement of the bearings around the journals, substantially in the manner described and for the purposes set forth.

3. The combination of the rockshaft provided with a series of journals set at an angle with its axis of rotation, means for rocking said shaft, a series of journal bearings each provided with a carrying finger and a stop hook device for limiting the rotatory motion of said bearing around its journal in one direction, substantially as described and for the purposes specified.

4. The combination of the rockshaft fitted with the described angular journals and means connected therewith for rocking said shaft, with the carrying fingers fitted with journal bearings to turn on said journals having provisions for limiting their rotary movement about the same, substantially as specified.

5. The combination with a harvester of a bundle carrier consisting of a set of carrying fingers each provided with a bearing adapted to turn on an angular journal of a rockshaft, a rock shaft fitted with a series of journals set at an angle with its axis of rotation upon which said fingers are journaled, an interlocking device interposed between each of said fingers and the rockshaft for supporting the fingers in receiving and carrying the load, and means connected with the rockshaft for discharging the load, substantially as described and set forth.

In testimony whereof I have hereto subscribed my name this 6th day of March, 1893.

EARL G. WATROUS.

In presence of—
EMILY SCOTT,
FRANKLIN SCOTT.